United States Patent
Bikulcius

(10) Patent No.: US 10,180,695 B1
(45) Date of Patent: Jan. 15, 2019

(54) DROPOUT RECOVERY WITH OVERSHOOT AND INRUSH CURRENT REDUCTION

(71) Applicant: Texas Instruments Incorporated, Dallas, TX (US)

(72) Inventor: Simon M. Bikulcius, San Jose, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/956,047

(22) Filed: Apr. 18, 2018

Related U.S. Application Data

(60) Provisional application No. 62/612,276, filed on Dec. 29, 2017.

(51) Int. Cl.
| | |
|---|---|
| G05F 1/575 | (2006.01) |
| G05F 1/46 | (2006.01) |
| G05F 1/62 | (2006.01) |

(52) U.S. Cl.
CPC .............. *G05F 1/575* (2013.01); *G05F 1/468* (2013.01); *G05F 1/62* (2013.01)

(58) Field of Classification Search
CPC ..... G05F 1/00; G05F 1/10; G05F 1/12; G05F 1/46
See application file for complete search history.

(56) References Cited

U.S. PATENT DOCUMENTS

2016/0126721 A1* 5/2016 Zhou ................ H02H 9/001
361/86

* cited by examiner

*Primary Examiner* — Adolf Berhane
*Assistant Examiner* — Afework Demisse
(74) *Attorney, Agent, or Firm* — Tuenlap D. Chan; Charles A. Brill; Frank D. Cimino

(57) ABSTRACT

In a power management device, a hiccup mode is implemented by using, for example, a counter to count the number of cycles for which a current limiting event has occurred and forcing the power management device to hiccup when a certain number of current limiting events have been counted. A soft start circuit is typically employed to ramp up the output voltage when the power management device is turned back on. By resetting the soft start voltage to the feedback voltage of the load of the power management device upon the first detection of a current limiting event, hiccup can be avoided because resetting the soft start voltage to the feedback voltage will reduce the current in proceeding cycles thereby avoiding additional current limiting events.

15 Claims, 4 Drawing Sheets

DROPOUT RECOVERY WITH OVERSHOOT AND INRUSH CURRENT REDUCTION

CROSS-REFERENCE TO RELATED APPLICATION

This application claims the benefit of U.S. Provisional Application No. 62/612,276, filed Dec. 29, 2017, which is incorporated by reference in its entirety herein.

TECHNICAL FIELD

This disclosure relates generally to power management devices and more specifically to voltage overshoot and inrush current reduction functionality of power management devices.

BACKGROUND

Power management devices are ubiquitous in today's society and necessary to deliver power to many of the devices we use every day such as phones and laptops. Some power management devices provide electrical isolation that allows the alternating current (AC) power provided by an outlet to be converted to the direct current (DC) power used by modern computing devices while other power management devices convert one DC power level to a second DC power level. The automobile industry has been adopting power management devices with an increasing pace in recent years.

As such, power management devices have become more essential to the function of the modern automobile. A power management device may take, for example, an input voltage and convert it to a desired output voltage. The ability of a given power management device, such as a buck converter, to regulate or convert a voltage can be affected by a number of environmental factors, such as temperature.

To mitigate the impact on the functionality and lifetime of automobile power management components, many automotive manufacturers are requiring power management devices to be able to be adapted to adverse environmental conditions. One such environmental condition results in a phenomenon known as cold crank. Under cold crank conditions the input voltage (e.g., a battery voltage) of a power management device having, for example, a nominal voltage of twelve volts may drop down to as low as approximately three volts. As the input voltage recovers from the cold crank condition a large amount of current is required to bring the output voltage of the power management device to the desired output voltage. This inrush of current can overheat and damage the power management device.

Automotive manufacturers often perform input voltage step response testing to emulate a cold crank condition of the input voltage. Cold crank testing involves causing the regulation voltage on a power management device, such as a buck converter, to deviate 10% or more from the nominal regulation voltage. The expectation is for the power management device to return to nominal output voltage after recovering from a large drop in the input voltage. However, when the duty cycle of a pulse width modulated signal controlling a power management device becomes more than 90% and the output voltage of the power management device is too low, the compensation current can reach a current limit. This results in either the output voltage overshooting the nominal regulation voltage or the inductor reaching a current limit and causing the power management device to enter a hiccup mode.

A hiccup mode is an over-current protection mechanism that turns off a power management device and causes it to enter a sleep mode when the inductor current becomes too high. A hiccup mode may be implemented by using, for example, a counter to count the number of cycles for which a current limiting event has occurred, thereby forcing the power management device to enter the hiccup mode when a certain number of current limiting events have been counted. A soft start circuit is typically employed to ramp up the output voltage when the power management device is turned back on.

SUMMARY

A power management device according to this disclosure may be, for example, a voltage regulator circuit with dropout recovery. The voltage regulator circuit in this example includes a soft start circuit and a clock signal generating circuit configured to generate a clock stretch signal in response to an absence of a reset signal, i.e., a reset signal not being received at the clock signal generating circuit. The example voltage regulator circuit further includes an under voltage detection circuit configured to determine an under voltage condition across a load of the voltage regulator circuit and to output an under voltage signal in response to determining occurrence of the under voltage condition. A current limit detection circuit is configured to determine a current limit condition and to output a current limit signal in response to determining occurrence of the current limit condition at an input of the voltage regulator circuit. A dropout recovery circuit is configured to reset a voltage of the soft start circuit to match a voltage of the feedback circuit in response to the dropout recovery circuit's having received each of the clock stretch signal, the under voltage signal, and the current limit signal. The power management device may further include a feedback circuit receiving a voltage signal corresponding to an output from the voltage regulator circuit, and the under voltage detection circuit may be configured to compare the voltage signal to an under voltage input value to determine the under voltage condition. The soft start circuit and the dropout recovery circuit may reset a voltage of the soft start circuit to the voltage of the feedback circuit when each of the clock stretch signal, the under voltage signal, and the current limit signal have been received by the dropout recovery circuit. By resetting the soft start voltage to the feedback voltage of the load of the power management device upon the first detection of a current limiting event, hiccup can be avoided because resetting the soft start voltage to the feedback voltage will reduce the current in proceeding cycles thereby avoiding additional current limiting events.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
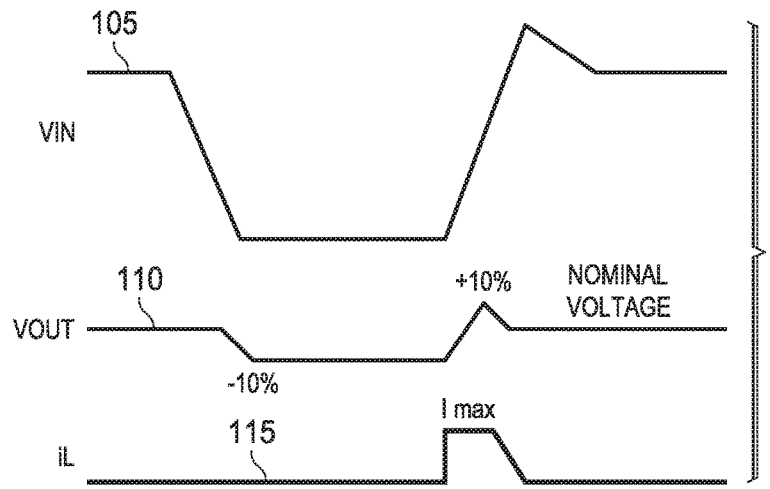
FIG. 1 illustrates example voltage and current waveforms for a prior art power management device under cold crank conditions.

Referring now to the figures, FIG. 1 illustrates voltage and current waveforms of a power management device under cold crank conditions. The input voltage 105 illustrates the input voltage level when, for example, the engine of a vehicle is turned on and the battery is cold. A large drop in the input voltage 105 to a power management device, such as a buck converter, caused by the battery being cold will result in a corresponding drop in the output voltage 110 of the power management device. A drop of ten percent or more of the nominal regulation of the output voltage 110 is referred to as extreme dropout.

As the input voltage 105 recovers, the output voltage 110 can overshoot the nominal regulation voltage. Depending a current limit and output capacitance of the power management device, the power management device may require a large inductor current 115 to bring the output voltage 110 up as the input voltage 105 rises sharply. Because of the sharp rise in the input voltage 105 the inductor current 115 may hit a current limit and cause the output voltage 110 to overshoot the nominal regulation voltage. When the inductor current 115 hits the current limit, the power management device may enter a hiccup mode.

Figure 2:
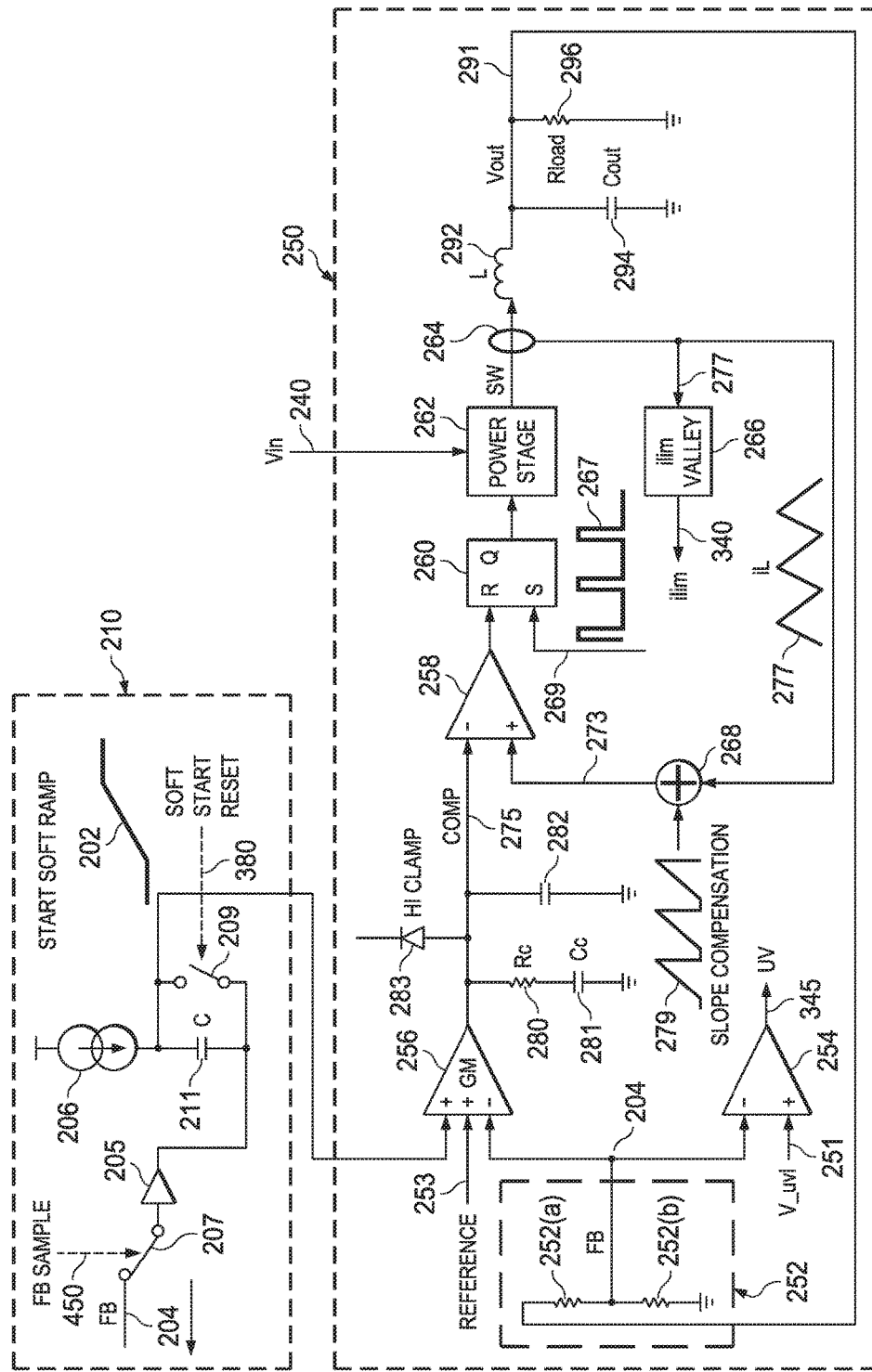
FIG. 2 illustrates a circuit diagram of an example power management device in accordance with various embodiments of the disclosure.

FIG. 2 is a circuit diagram of an example power management device apparatus according to this disclosure. The power management device includes a control circuit 250 and a soft start circuit 210. The control circuit 250 receives an input voltage 240 from an external source such as a battery and functions as a buck converter having an inductor 292, an output capacitor 294, and a resistive load 296. The output voltage 291 across the resistive load 296 is fed back to a feedback circuit 252. The feedback circuit 252 is a voltage divider having two resistive elements 252a and 252b. A feedback voltage 204 from the feedback circuit's 252 voltage divider is used as input to both a transconductance amplifier 256 and an under voltage detection circuit 254. The under voltage detection circuit 254 may be, for example, a comparator. A feedback voltage 204 across the feedback circuit 252 can be compared to an under voltage threshold value 251 by the under voltage detection circuit 254 to determine whether an under voltage condition has occurred. For example, if the under voltage detection circuit 254 determines that the feedback voltage 204 is less than the under voltage threshold value 251, then the under voltage logic signal 345 will be logic HIGH. Similarly, if the under voltage detection circuit 254 determines that the feedback voltage 204 is greater than the under voltage threshold value, the under voltage logic signal 345 will be logic LOW. The under voltage detection circuit 254 outputs the under voltage logic signal 345 to dropout recovery circuit 400.

As will be described in more detail below, when the output voltage 291 is in an under voltage state, the under voltage detection circuit 254 will cause the soft start circuit 210 to begin to sample the feedback voltage 204 from the feedback circuit's 252 voltage divider by causing the switch 207 to close, thereby allowing the buffer 205 to receive the feedback voltage 204. As discussed in greater detail below, the dropout recovery circuit 400 will cause the feedback (FB) sample signal 450 to close the switch 207 by setting the FB sample signal 450 logic HIGH when a clock stretch event occurs after the under voltage detection circuit 254, illustrated as a comparator, detects an under voltage condition of the resistive load 296. The current source 206 charges the capacitor 211 while the soft start circuit 210 is sampling the feedback voltage 204. The buffer 205 isolates the feedback voltage from the rest of the soft start circuit 210.

The transconductance amplifier 256 takes three voltages as inputs; the feedback voltage 204 across the feedback circuit 252, a soft start voltage 202 across the capacitor 211 of the soft start circuit 210, and a reference voltage 253. The soft start voltage 202 is illustrated as a voltage over time waveform. When the soft start voltage 202 is less than or equal to the reference voltage 253, the transconductance amplifier 256 outputs a current that induces a voltage in the compensation stage ("comp") corresponding to the voltage across the capacitor 211 of the soft start circuit 210. In this case, the output current can be governed by equation (1) below.

$$I_0 = g_m(\text{reference voltage} - \text{feedback voltage})$$

The parameter $g_m$ is a ratio of a current of the transconductance amplifier 256 to a voltage of the transconductance amplifier 256 or a design dependent target. When the soft start voltage is greater than the reference voltage 253, the transconductance amplifier 256 outputs a current that induces a voltage less than reference voltage 253 in the compensation stage. In this case, the output current can be governed by equation (2) below.

$$I_0 = g_m(\text{soft start voltage} - \text{feedback voltage})$$

The parameter $g_m$ is the same parameter $g_m$ used in equation (1) above.

The compensation stage has at least a compensation resistor 280, a compensation capacitor 281, and a smoothing capacitor 282. The compensation resistor 280 and the compensation capacitor 281 are connected in series and determine the voltage of the compensation stage according to the current output from the transconductance amplifier 256. The smoothing capacitor 282 acts to smooth any voltage disturbance in the compensation stage. The current through the compensation stage is limited to a maximum value by the clamp circuit 283. A compensated current waveform 275 is fed into a comparator 258 along with a slope compensated current waveform 273 output from summing node 268. The slope compensated current waveform 273 is the sum of the inductor current waveform 277 and a slope compensation waveform 279. The inductor current waveform 277 is measured by current sensor 264. The current sensor may be either analog or digital. For example, the current sensor 264 maybe be a Hall effect IC, a resistor, or a fluxgate transformer.

When the difference between the compensated current waveform 275 and the slope compensated current waveform 273 fails to reset RS latch 260, the clock signal generating circuit 267 causes the clock signal 269 to be stretched until the inductor current 277 has undergone slope compensation using a slope compensation waveform 279 at summing node 268 such that the difference between the compensated current waveform 275 and the slope compensated current waveform 273 causes the RS latch 260 to reset. The RS latch 260 will be reset when the output of comparator 258 becomes logic HIGH. The output of the RS latch 260 drives the power stage 262. The power stage may include, for example, a high-side and a low-side field effect transistor. When the clock signal generating circuit 267 causes the clock signal 269 to be stretched, the clock signal generating circuit sends the clock stretch signal 330 to the dropout recovery circuit 400.

Figure 7:
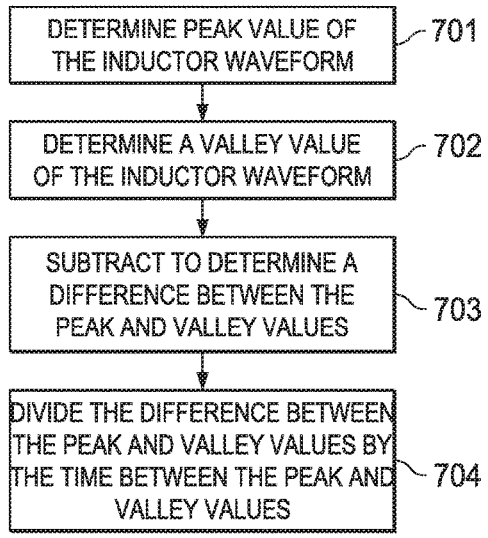
FIG. 7 illustrates a flow chart of an example method of operation of the current limit detection circuit of FIG. 2.

The current limit detection circuit 266 determines the slope of the falling edge of the inductor current waveform 277. If the slope is too great (i.e., too vertical), the current limit detection circuit 266 sets the ilim logic signal 340 to logic HIGH. The current limit detection circuit 266 may be any processing circuit configured to determine the slope by, for example, executing the following steps illustrated in FIG. 7: determining 701 a peak value of the inductor current waveform; determining 702 the valley value (i.e., a value during dropping value following the peak value) of the inductor current waveform; subtracting 703 the valley value from the peak value to determine a difference; and dividing 704 the difference by the time between the detection of the peak value and the valley value. The time between the detection of the peak value and the valley value may be either a constant value or a measured value. The current limit detection circuit 266 outputs the ilim logic signal 340 to the dropout recovery circuit 400.

Figure 3:
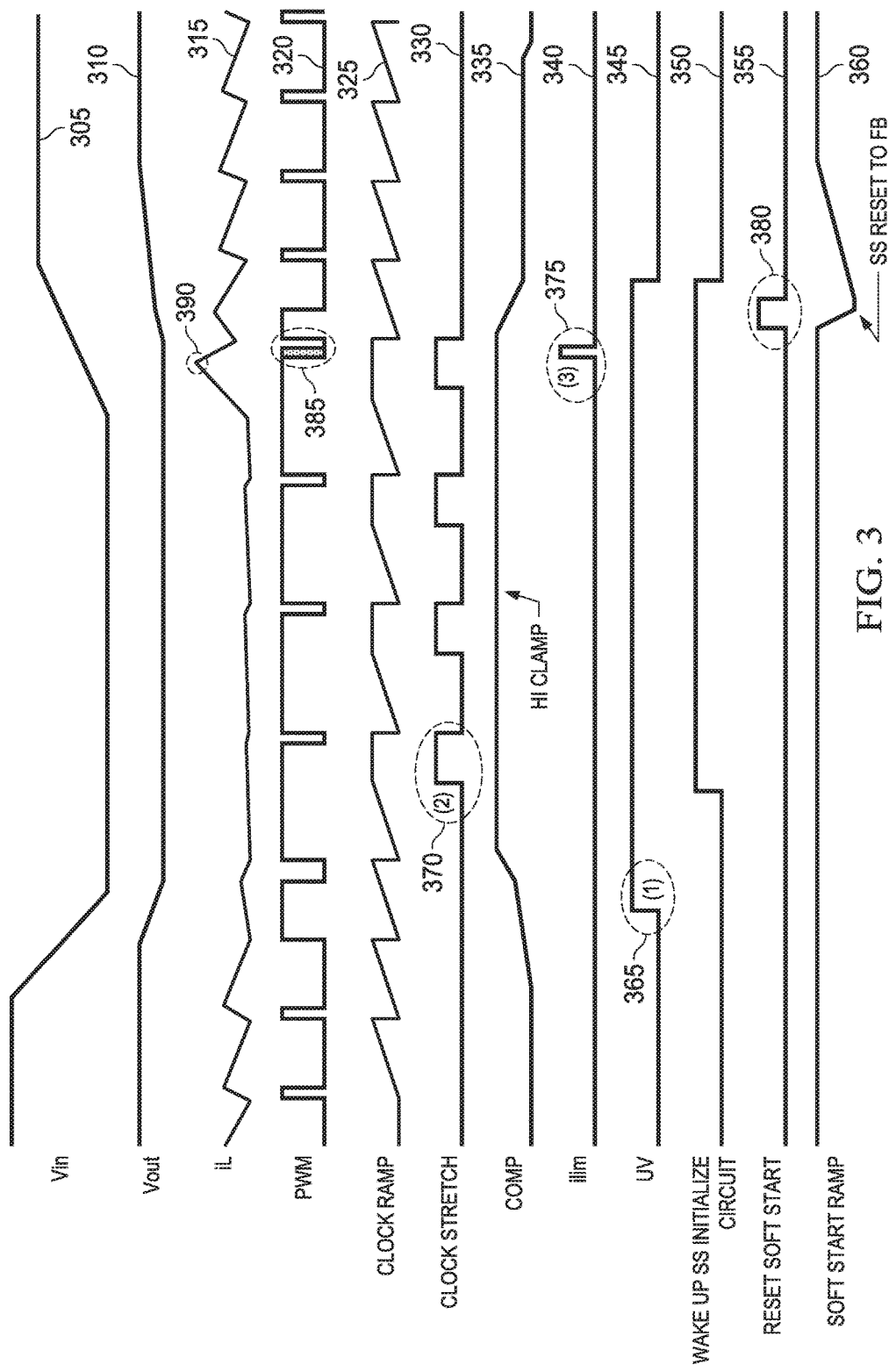
FIG. 3 illustrates example logic signals and power waveforms for a power management device in accordance with various embodiments of the disclosure.
Figure 6:
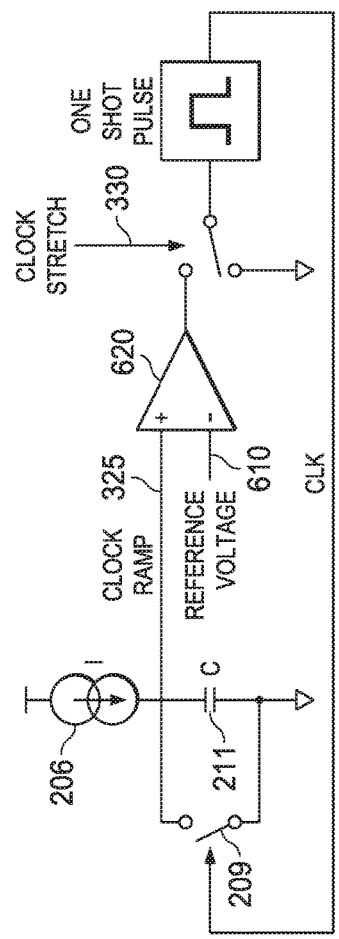
FIG. 6 illustrates example of the clock signal generating circuit of FIG. 2.

FIG. 3 illustrates timing among power waveforms and logic signals in an example power management device according to this disclosure. A decrease in the input voltage waveform 305 causes a corresponding decrease in the output voltage waveform 310. If the output voltage waveform 310 drops below a threshold voltage, such as the under voltage threshold value 251, the under voltage logic signal 345 moves from logic LOW to logic HIGH as illustrated at time 365. Because of the drop in the output voltage 310, the duty cycle of pulse width modulation (PWM) logic signal 320 is increased to attempt to maintain the output voltage 310 at the nominal regulation voltage. After the duty cycle is increased past some value, for example, 70, 80, or 90 percent, a clock stretch logic signal 330 is generated by the clock signal generating circuit 267, illustrated in FIG. 6, as shown at time 370. The clock signal generating circuit of FIG. 6 creates a one-shot pulse when having a voltage determined by the output of comparator 620 when the voltage of the clock signal 325 is greater than a reference voltage 610 and the clock stretch signal is logic HIGH. The reference voltage may be determined from $V_{in}$ 305, $V_{out}$ 310, or it may be a set value. The reference voltage 610 may also correspond to the reference voltage 253. A few clock cycles prior to the rising edge clock stretch signal 330, as illustrated at time 370, the soft start circuit 210 is initialized by wake up soft start initialization logic signal 350. The increased duty cycle of the PWM logic signal 320 causes compensation current 335 to increase until it reaches a maximum value. As the input voltage waveform 305 begins to rise, the inductor current 315 becomes large as illustrated at time 390. The inductor current 315 becomes large because the compensation current 335 is at its maximum value and because the power stage 262 is conducting most of the time as a result of the large duty cycle of the PWM logic signal 320. When the power stage 262 stops conducting, current limit detection circuit 266 generates a pulse at time 375 that causes the clock signal generating circuit 267 to hold the clock signal 325 logic HIGH until the inductor current 315 decreases to a safe value as illustrated at time 385. In response to the ilim logic signal 340 becoming logic HIGH at time 375, the soft start circuit 210 is reset to the feedback voltage 204 across the feedback circuit's 252 voltage divider to reduce the inductor current 315 in later cycles. By resetting the soft start circuit 210 to the feedback voltage 204 during dropout recovery inrush current is limited and overshoot of the output voltage 310 is avoided. Similarly, there is no need for the power management device to hiccup because the load current has been reduced.

Figure 4:
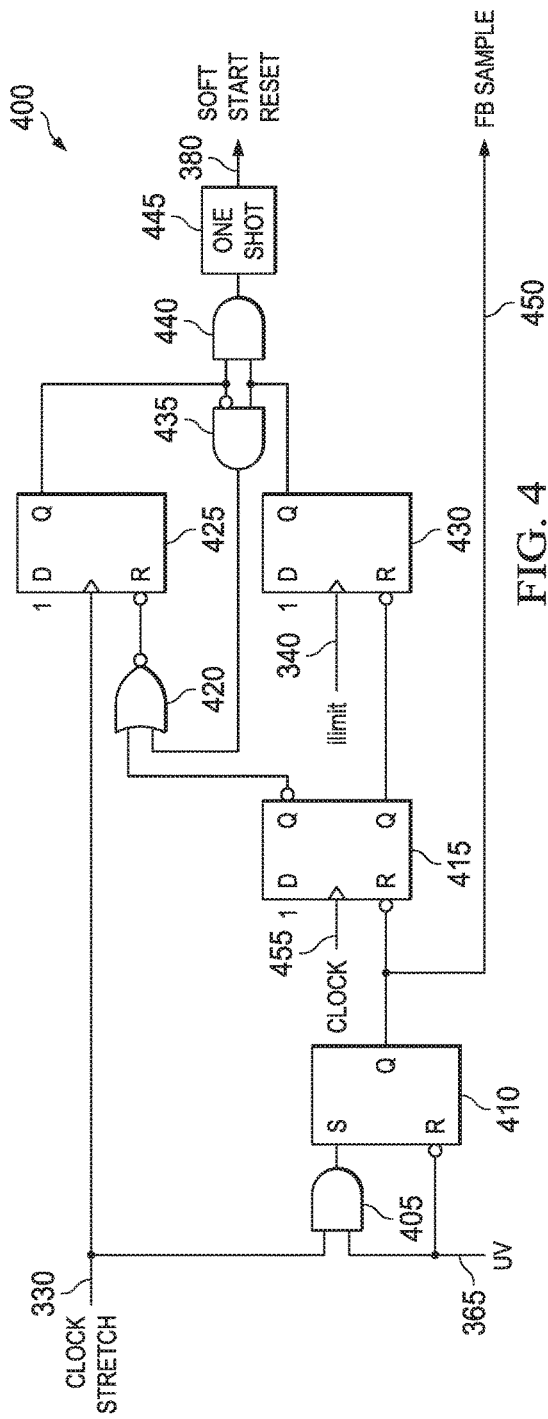
FIG. 4 illustrates an example dropout recovery circuit in accordance with various embodiments of the disclosure.

FIG. 4 illustrates an example dropout recovery circuit 400 of a power management device according to this disclosure. The output of the SR latch 410 is set to logic HIGH by AND gate 405 when both the under voltage logic signal 345 and the clock stretch logic signal 330 are logic HIGH at the same time. The output of the SR latch 410 persists in the logic HIGH state until the under voltage logic signal 345 becomes logic LOW. While SR latch 410 is logic HIGH, the switch 207 of the soft start circuit 210 is conducting, causing the soft start circuit to sample the feedback voltage 204 and store it across the capacitor 211. D flip-flop 415 outputs the value on the data line "D" on the rising edge of the of a clock signal 455 and is reset when the output of the SR latch 410 become logic LOW. So long as the under voltage logic signal 345 and the clock stretch 330 were at some point logic HIGH at the same time and since that time the under voltage logic signal 345 has not become logic LOW, the output of the D flip-flop 415 will be logic HIGH. The output of the D flip-flop 415 is inverted and provided to the D flip-flop 430 and the NOR gate 420 as input. The D flip-flop 430 will output a logic HIGH signal on the rising edge of a logic pulse, such as logic pulse at time 375, from the current limit detection circuit 266 and will persist in the logic HIGH state until the D flip-flop 415 becomes logic LOW. D flip-flop 425 becomes logic HIGH on the rising edge of the clock stretch logic signal 330. Because the logic output of both the D flip-flop 425 and the D flip-flop 430 are logic HIGH, the output of the AND gate 440 is logic HIGH which causes the one shot circuit 445 to generate soft start reset pulse 380 on the reset soft start logic signal 355, which causes the switch 209 of the start circuit 210 to conduct and reset the soft start voltage to the feedback voltage 204 as illustrated by soft start ramp waveform 360. The output of NOR gate 420 is inverted therefore if either or both of the outputs of D flip-flop 415 or AND gate 435 become logic HIGH then D flip-flop 425 will be reset. The NOR gate 420 and the AND gate 435 act to prevent the soft start reset from occurring when the under voltage logic signal 345 is logic HIGH and the ilim logic signal 340 becomes logic HIGH before the clock stretch signal 330 becomes logic HIGH. This may occur when the current limiting event is the result of some other factor other than dropout recovery.

Figure 5:
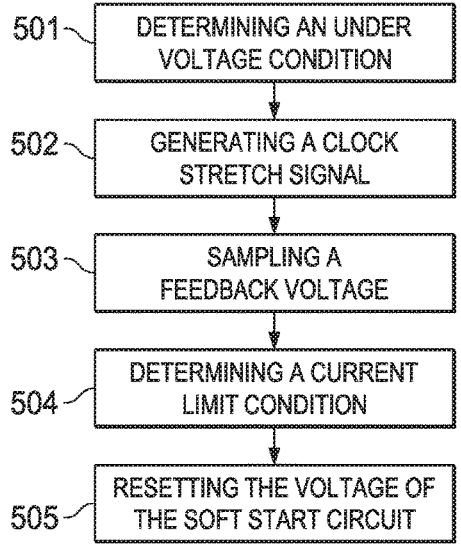
FIG. 5 illustrates a flow chart of an example method of operation as configured in accordance with various embodiments of the disclosure.

FIG. 5 is a flow chart illustrating an example operation of a power management device with voltage overshoot and inrush current reduction as described above. At step 501 an under voltage condition is determined. The under voltage condition may be determined by, for example, comparing a feedback voltage to an under voltage threshold value. At step 502 a clock stretch signal is generated. The clock stretch signal is generated because the state of an RS latch, such as RS latch 260, failed to change states by the time the clock signal needed to be reset. In step 503, when a clock stretch signal is generated while the under voltage condition is occurring (e.g., the output of under voltage detection circuit 254 is logic HIGH) the dropout recovery circuit corresponding to the logic diagram of the FIG. 4 will cause a soft start circuit such as the soft start circuit 210 to sample a feedback voltage such as the feedback voltage 204. In step 504 a current limit condition is detected by determining the slope of the inductor current waveform 277 as described above. When the current limit condition is detected a clock signal such as clock signal 325 will remain logic HIGH until the inductor current 315 falls to a safe level. In step 505 the voltage of the soft start circuit is reset to the feedback voltage by the dropout recovery circuit to prevent a current limit condition from occurring in the next cycle and to prevent the output voltage from overshooting the nominal regulation voltage.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the disclosure, and that such modifications, alterations, and combinations are to be viewed as being within the ambit of the inventive concept.

What is claimed is:

1. An apparatus comprising:
    a clock signal generating circuit configured to generate a clock stretch signal in an absence of a reset signal;
    an under voltage detection circuit configured to determine an under voltage condition and to output an under voltage signal in response to determining that the under voltage condition has occurred;
    a current limit detection circuit configured to determine a current limit condition and to output a current limit signal in response to determining that the current limit condition has occurred; and
    a dropout recovery circuit configured to set a soft start voltage of a soft start circuit upon receiving the clock stretch signal from the clock signal generating circuit, the under voltage signal from the under voltage detection circuit, and the current limit signal from the current limit detection circuit.

2. The apparatus of claim 1, further comprising: a feedback circuit configured to output a feedback voltage corresponding to an output voltage of the apparatus, wherein the under voltage detection circuit is configured to compare the feedback voltage to an under voltage input value to determine the under voltage condition.

3. The apparatus of claim 2, wherein the dropout recovery circuit is configured to reset a voltage of the soft start circuit to the feedback voltage upon receiving the clock stretch signal from the clock signal generating circuit, the under voltage signal from the under voltage detection circuit, and the current limit signal from the current limit detection circuit.

4. The apparatus of claim 1, further comprising a voltage regulator circuit comprising an input terminal and a resistive load, wherein the under voltage detection circuit is configured to detect the under voltage condition across the resistive load of the voltage regulator circuit, and wherein the current limit detection circuit is configured to determine the current limit condition at the input terminal of the voltage regulator circuit.

5. The apparatus of claim 2 wherein the dropout recovery circuit is configured to cause the soft start circuit to sample the feedback voltage when the clock stretch signal is generated after the under voltage condition is determined to have occurred.

6. The apparatus of claim 2 wherein the dropout recovery circuit is configured to set the soft start voltage to the feedback voltage upon the dropout recovery circuit receiving the clock stretch signal from the clock signal generating circuit, the under voltage signal from the under voltage detection circuit, and the current limit signal from the current limit detection circuit.

7. A method for dropout recovery using a soft start circuit, the method comprising:
    determining, by an under voltage determining circuit, an under voltage condition;
    generating, by a clock signal generating circuit, a clock stretch signal in an absence of receiving a reset signal at the clock signal generating circuit;
    determining, by a current limit determining circuit, a current limit condition; and
    resetting, by a dropout recovery circuit, a soft start voltage of the soft start circuit when the clock stretch signal has been generated and each of the current and under voltage conditions have been detected.

8. The method of claim 7, wherein the determining an under voltage condition comprises:
    comparing, by the under voltage detection circuit, a feedback voltage of a feedback circuit to an under voltage input value to determine the under voltage condition.

9. The method of claim 7, wherein the resetting the soft start circuit further comprises:
    resetting, by the dropout recovery circuit, a voltage of the soft start circuit to match a feedback voltage of a feedback circuit upon receiving, at the dropout recovery circuit, the clock stretch signal from the clock signal generating circuit, the under voltage signal from the under voltage detection circuit, and the current limit signal from the current limit detection circuit.

10. The method claim 9 further comprising: causing, by the dropout recovery circuit, the soft start circuit to sample the feedback voltage when a clock stretch signal is generated after the under voltage condition has been determined.

11. The method claim 9, further comprising resetting the soft start voltage, by the dropout recovery circuit, to the feedback voltage when the clock stretch signal has been generated and both the current limit condition and the under voltage condition have been detected.

12. A power management device comprising:
a soft start circuit;
a clock signal generating circuit configured to generate a clock stretch signal in an absence of a reset signal;
an under voltage detection circuit configured to determine an under voltage condition across a load of the voltage regulator circuit and to output an under voltage signal in response to determining occurrence of the under voltage condition;
a current limit detection circuit configured to determine a current limit condition and to output a current limit signal in response to determining occurrence of the current limit condition at an input of the voltage regulator circuit; and
a dropout recovery circuit configured to reset a soft start voltage of the soft start circuit to a feedback voltage of the feedback circuit upon the dropout recovery circuit receiving the clock stretch signal from the clock signal generating circuit, the under voltage signal from the under voltage detection circuit, and the current limit signal from the current limit detection circuit.

13. The power management device of claim 12 further comprising:
a feedback circuit configured to output a feedback voltage corresponding to an output voltage of the power management device, wherein the under voltage detection circuit is configured to compare the feedback voltage to an under voltage input value to determine the under voltage condition.

14. The power management device of claim 13, wherein the dropout recovery circuit is configured to reset a voltage of the soft start circuit to the feedback voltage upon receiving the clock stretch signal from the clock signal generating circuit, the under voltage signal from the under voltage detection circuit, and the current limit signal from the current limit detection circuit.

15. The power management device claim 13 wherein the dropout recovery circuit is configured to cause the soft start circuit to sample the feedback voltage when the clock stretch signal is generated after the under voltage condition is determined to have occurred.

\* \* \* \* \*